(12) United States Patent
Simitsis et al.

(10) Patent No.: US 11,294,900 B2
(45) Date of Patent: Apr. 5, 2022

(54) REAL-TIME MONITORING AND ANALYSIS OF QUERY EXECUTION

(71) Applicant: MICRO FOCUS LLC, Santa Clara, CA (US)

(72) Inventors: Alkiviadis Simitsis, Santa Clara, CA (US); William K. Wilkinson, San Mateo, CA (US); Jorge Augusto Saldivar Galli, Palo Alto, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 1463 days.

(21) Appl. No.: 15/114,337

(22) PCT Filed: Mar. 28, 2014

(86) PCT No.: PCT/US2014/032133
§ 371 (c)(1),
(2) Date: Jul. 26, 2016

(87) PCT Pub. No.: WO2015/147853
PCT Pub. Date: Oct. 1, 2015

(65) Prior Publication Data
US 2017/0004173 A1    Jan. 5, 2017

(51) Int. Cl.
*G06F 16/2453* (2019.01)
*G06F 11/34* (2006.01)

(52) U.S. Cl.
CPC ............... *G06F 16/24542* (2019.01)

(58) Field of Classification Search
None
See application file for complete search history.

(56) References Cited

U.S. PATENT DOCUMENTS

| | | | |
|---|---|---|---|
| 8,364,623 B1 * | 1/2013 | Bunker | G06Q 10/06 706/47 |
| 8,666,970 B2 | 3/2014 | Albrecht et al. | |
| 2006/0106851 A1 | 5/2006 | Warshawsky | |
| 2006/0218125 A1 * | 9/2006 | Kandil | G06F 11/362 |
| 2007/0112737 A1 | 5/2007 | Carlson et al. | |
| 2009/0077013 A1 * | 3/2009 | Hu | G06F 17/30306 |
| 2009/0171927 A1 | 7/2009 | Nesamoney | |
| 2009/0327242 A1 * | 12/2009 | Brown | G06F 17/30463 |
| 2010/0223253 A1 * | 9/2010 | Gopal | G06F 16/217 707/713 |

(Continued)

OTHER PUBLICATIONS

Oracle, "Real-Time SQL Monitoring," 2009 (Year: 2009).*

(Continued)

*Primary Examiner* — Usmaan Saeed
*Assistant Examiner* — Yu Zhao (57) ABSTRACT

Example embodiments relate to providing real-time monitoring and analysis of query execution. In example embodiments, a query plan is obtained for a database query that is scheduled for execution in a database. A query tree is then generated based on the query plan, where the query tree includes operator nodes that are associated corresponding operators in the query plan. At this stage, performance metrics are collected from the database during the execution of the database query. Next, the query tree is displayed with the performance metrics, where a related portion of the performance metrics are displayed in each of the operator nodes.

18 Claims, 6 Drawing Sheets

(56) References Cited

U.S. PATENT DOCUMENTS

| | | | |
|---|---|---|---|
| 2010/0312762 A1* | 12/2010 | Yan | G06F 16/24532 |
| | | | 707/716 |
| 2012/0084315 A1 | 4/2012 | Schneider | |
| 2013/0152057 A1* | 6/2013 | Ke | G06F 8/453 |
| | | | 717/132 |
| 2014/0172914 A1* | 6/2014 | Elnikety | G06F 17/30958 |
| | | | 707/774 |
| 2016/0292230 A1 | 10/2016 | Simitsis et al. | |
| 2016/0292233 A1 | 10/2016 | Wilkinson et al. | |
| 2017/0004173 A1 | 1/2017 | Simitsis et al. | |

OTHER PUBLICATIONS

Ford, "SQL Server Query Execution Plans in SQL ServerManagement Studio," 2009 (Year: 2009).*

"Displaying Graphical Execution Plans (SQL Server Management Studio)," Microsoft, Sep. 11, 2005, http://technet.microsoft.com/en-us/library/ms178071(v=sql.105).aspx>.

Chaitanya Mishra, "ConEx: A System for Monitoring Queries," Jun. 12-14, 2007, <http://www.cs.toronto.edu/~mvolkovs/ConEx.pdf>.

Mrunal Gawade, "Stethoscope: A Platform for interactive Visual Analysis of Query Execution Plans," Aug. 27-31, 2012, <http://vldb.org/pvldb/vol5/p1926_mrunalgawade_vldb2012.pd.

Li, et al., "GSLPI: A Cost-based Query Progress Indicator", In IEEE 28th International Conference on Data Engineering, 2012, pp. 678-689.

* cited by examiner

REAL-TIME MONITORING AND ANALYSIS OF QUERY EXECUTION

BACKGROUND

A query execution plan (hereinafter "query plan") is an ordered set of steps describing a structured query language (SQL) statement for accessing a database management system (DBMS). A query plan may include a set of query operators, an amount of data for processing by the operators, etc. Typically, query plans can be graphically represented as trees with query operators as nodes. Graphical query trees can be used to tune the SQL statement by, for example, modifying table indexes.

BRIEF DESCRIPTION OF THE DRAWINGS

The following detailed description references the drawings, wherein.

DETAILED DESCRIPTION

As detailed above, query plans can be visualized to assist in query optimizations. Further, with respect to performance metrics, a query submitted to a database engine typically does not provide any guidance for its expected running time, which is only provided after the query is completed. However, a user who desires near real-time results may become impatient when the query takes longer than expected. Alternatively, a user awaiting completion of a query that has been running for an extended period of time has no indication if the query is making reasonable progress. In this case, the user's best option is to wait or, if the query is blocked or resource-starved, to abort the query and start over.

Examples embodiments disclosed herein provide users with real-time metrics and analysis during the execution of a query. Although most database engines provide tools to collect low-level metrics about query execution, such metrics are typically voluminous and difficult to interpret in view of the original database query. Described below are examples that present a graphical representation of the query that is easy to understand. The graphical representations are animated to show query progress and may provide analysis of the progress to alert the user of problem conditions and suggested resolutions. Further, the graphical representations enable the user to explore alternative forms of the query that may improve performance.

In some embodiments, a query plan is obtained for a database query that is scheduled for execution in a database. A query tree is then generated based on the query plan, where the query tree includes operator nodes that are associated corresponding operators in the query plan. At this stage, performance metrics are collected from the database during the execution of the database query. Next, the query tree is displayed with the performance metrics, where a related portion of the performance metrics are displayed in each of the operator nodes.

In this manner, example embodiments disclosed herein provide real-time monitoring and analysis of query execution. Specifically, a graphical representation of a query tree that includes real-time metrics and analysis is provided to facilitate optimizations of the query.

Figure 1:
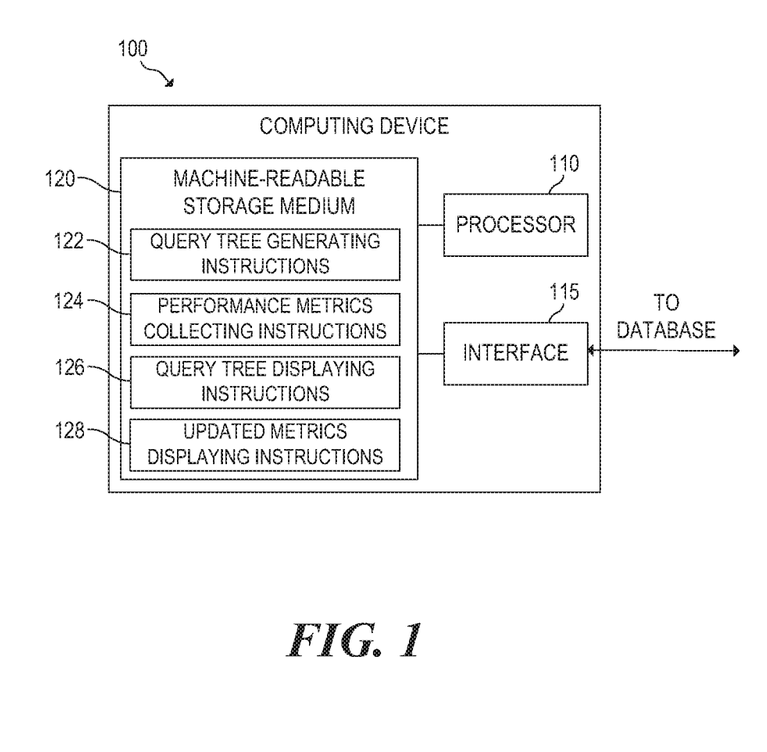
FIG. 1 is a block diagram of an example computing device for providing real-time monitoring and analysis of query execution.

Referring now to the drawings, FIG. 1 is a block diagram of an example computing device 100 for providing real-time monitoring and analysis of query execution. Computing device 100 may be any computing device (e.g., database server, desktop computer, server node, distributed server, etc.) that has access to a database, such as database 250 of FIG. 2. In FIG. 1, computing device 100 includes a processor 110, an interface 115, and a machine-readable storage medium 120.

Processor 110 may be one or more central processing units (CPUs), microprocessors, and/or other hardware devices suitable for retrieval and execution of instructions stored in a non-transitory, machine-readable storage medium 120. Processor 110 may fetch, decode, and execute instructions 122, 124, 126, 128 to provide real-time monitoring and analysis of query execution, as described below. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with databases. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the database. Alternatively, interface 115 may be a wireless interface, such as a wireless local area network (WLAN) interface or a near-field communication (NEC) interface. In operator, as detailed below, interface 115 may be used to send and receive data to and from a corresponding interface of a database.

Machine-readable storage medium 120 may be any non-transitory electronic, magnetic, optical, or other physical storage device that stores executable instructions. Thus, machine-readable storage medium 120 may be, for example, Random Access Memory (RAM), non-volatile RAM, an Electrically-Erasable Programmable Read-Only Memory (EEPROM), a storage drive, an optical disc, and the like. As described in detail below, machine-readable storage medium 120 may be encoded with executable instructions for providing real-time monitoring and analysis of query execution.

Query tree generating instructions 122 obtain a query plan from the database, which is then used to create a query tree. The query plan describes the operators (e.g., union, join, select, scan, group by, etc.) of a database query that is to be executed in the database. In this case, the operators are represented as nodes in the query tree, where the query tree represents the parent-child relationships between the operators. Each operator is represented as an operator node in the query tree (i.e. an operator node is the representation of an operator from the query plan).

Performance metrics collecting instructions 124 collect performance metrics from the database during the execution of the query. Examples of performance metrics include, but are not limited to, execution time, memory allocated, memory reserved, rows produced, bytes sent, bytes received, etc. In some cases, the database may be polled at regular intervals to collect the performance metrics. Alternatively, the database may provide the performance metrics in real-time. The performance metrics may be cumulative with respect to the start of the database query.

Query tree displaying instructions 126 render a graphical representation of the query tree. For example, the query tree can be rendered as described with respect to FIG. 6A below. In the graphical representations, associated performance metrics are displayed within each of the operator nodes, allowing the user to view the performance metrics associated with each of the operators in real-time. Each node in the displayed query tree may also represent the current status (e.g., waiting, running, finished, non-operator, etc.) of its corresponding operator.

Updated metrics displaying instructions 128 display updated performance metrics as the metrics are collected from the database. Specifically, as the execution of the query continues, updated performance metrics are collected from the database and then used to update the operator nodes shown in the query tree. In other words, the performance metrics are animated in the query tree in real-time. In this manner, the user can view the performance metrics of the operator nodes as the query is executing. Further, the current execution status of the operator nodes may also be updated.

Figure 2:
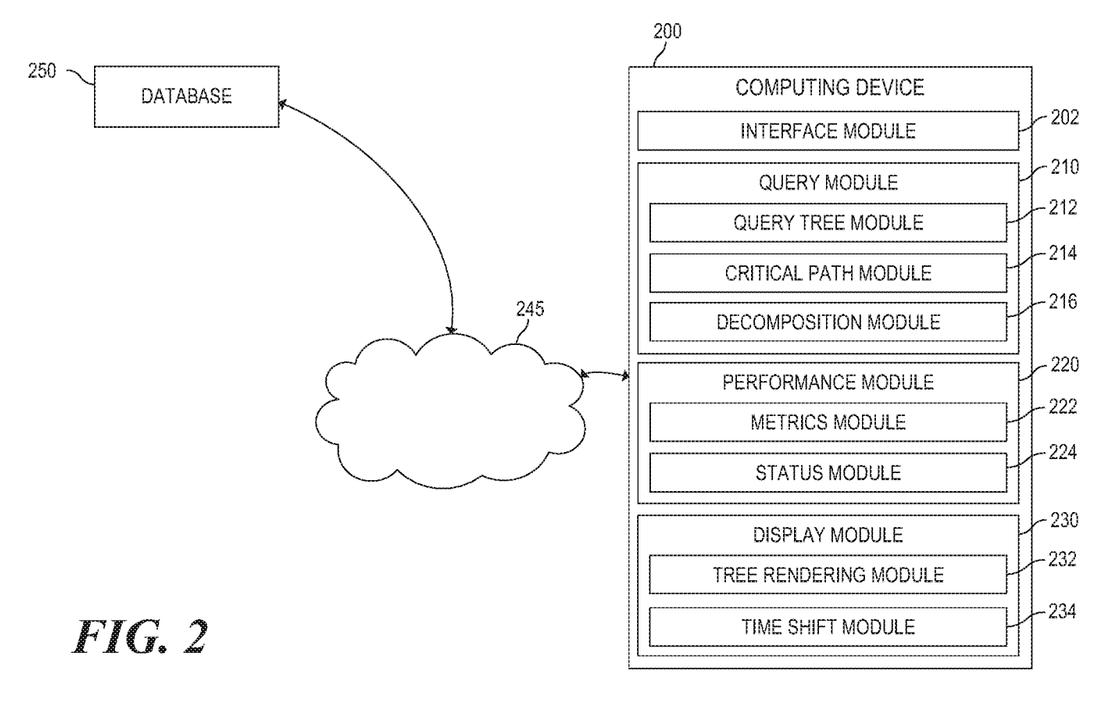
FIG. 2 is a block diagram of an example computing device in communication with a database for providing real-time monitoring and analysis of query execution.

FIG. 2 is a block diagram of an example computing device 200 in communication via a network 245 with database 250. As illustrated in FIG. 2 and described below, computing device 200 may communicate with database 250 to provide real-time monitoring and analysis of query execution.

As illustrated, computing device 200 may include a number of modules 202-234. Each of the modules may include a series of instructions encoded on a machine-readable storage medium and executable by a processor of the computing device 200. In addition or as an alternative, each module may include one or more hardware devices including electronic circuitry for implementing the functionality described below.

As with computing device 100 of FIG. 1, computing device 200 may be a database server, desktop computer, server node, distributed server, or any other device suitable for executing the functionality described below. As detailed below, computing device 200 may include a series of modules 202-234 for providing real-time monitoring and analysis of query execution.

Interface module 202 may manage communications with database 250. Specifically, the interface module 202 may initiate connections with database 250 and then send or receive query data to/from database 250.

Query module 210 may manage queries for database 250. Although the components of query module 210 are described in detail below, additional details regarding an example implementation of module 210 are provided above in connection with instructions 122 of FIG. 1.

Query tree module 212 generates query trees for queries of database 250. For example, for a query that is to be executed by database 250, query tree module 212 may request the query plan for the query from database 250 and then use the query plan to generate a query tree. As discussed above, the query plan describes the operators of a query that is to be executed in the database. Specifically, the query plan may include an ordered set of steps (i.e., operators) that are used to access data in a database. Typically, query plans are created by a query optimizer of the database in response to receiving a query.

A query tree graphically represents the query form in a hierarchical tree that is more easily understood by a user than a query plan. For example, the query tree allows the user to determine which operators are dependent on other operators and, thus, to identify potential bottle-necks in the query plan.

Critical path module 214 analyzes query trees to identify critical paths. A critical path in a query tree is a path in the query tree that is identified as consuming a large amount of resources. Initially, to perform the analysis, critical path module 214 may use performance module 220 as described below to obtain performance metrics for the operator nodes in the query tree. At this stage, critical path module 214 can then identify operator nodes that use excessive resources (e.g., execution time, memory, etc.) based on the performance metrics. In some cases, critical path module 214 is used to perform critical path analysis after the query is completed and cumulative performance metrics have been collected. In other case, critical path module 214 is used in real-time to evaluate performance metrics as they are collected.

Decomposition module 216 processes query trees to identify subqueries that can be analyzed in isolation. Specifically, based on the critical paths identified by critical path module 214, decomposition module 216 may identify subqueries in the query tree that should be analyzed in isolation. A subquery is analyzed in isolation by separating a tree subset of the nodes in the query tree along the critical path to generate a subquery tree. Further, additional SQL may be added to the subquery tree to complete the query statement so that it is executable (e.g., adding a select portion, etc.). The subquery tree can then be analyzed in real-time as described with respect to query trees.

Decomposition module 216 may isolate subqueries in response to a user selection of an operator node in the query tree. In response to a selection, decomposition module 216 may (1) isolate the selected node of the query tree; (1) study the corresponding part of the selected node's query plan; (3) generate execution code in a programming language (e.g., SQL) to run the subquery; and (4) generate a textual description in natural language explaining what this subquery accomplishes. Specifically, decomposition module 216 may use the user-selected node of the query tree as a root for a new subquery tree and also automatically include in the new subquery tree all descendant nodes needed to form a valid query. Most node selections result in a semantically correct query after some manipulation of the subquery tree is performed. For example, an extra statement like "select*from (<<SQL corresponding to the selected nodes>>) as newSubquery" may be added to create the valid query.

However, the number of choices for creating a new subquery is exponentially large. In this case, decomposition module 216 may assist the user by identifying multiple interesting subqueries, which the user can make a selection from. Identifying interesting subqueries can be performed in various manners depending on the objective of query decomposition. For example, for identifying operator hogs in a query, interesting subqueries may be identified by analyzing the performance metrics collected during query execution. Applying a function similar to $f_{imp}$, as described below with respect to FIG. 6A, to an operator node or a tree subset of the query tree returns an estimate of the information value for that node or tree subset. Clustering the information value of the candidate subqueries may identify the stronger clusters that in turn can identify the most interesting subqueries for that objective. In another example for assisting users in debugging a query, the logical level of the query can be analyzed to split the query using a set of structure-related heuristics. Example heuristics include determining whether to cut a query at n-ary operations like merge (e.g., join, union) or fork (e.g., router) operations or determining parameters other than query performance (e.g., fault tolerance) at places where the data pipeline breaks.

Performance module 220 may collect metrics and execution status information from database 250. Although the components of performance module 220 are described in detail below, additional details regarding an example implementation of module 220 are provided above in connection with instructions 124 of FIG. 1.

Metrics module 222 collects performance metrics from database 250. As discussed above, performance metrics include execution time, memory allocated, memory reserved, rows produced, bytes sent, bytes received, etc. Any number of various performance metrics may be collected depending on the database provider. In some cases, the performance metrics are cumulative such that the amount of resources attributed to a particular operator cumulatively increase as the query is executed. In other cases, the performance metrics are real-time measurements that show the amount of resources that are currently being consumed by a particular operator.

Status module 224 collects status information from database 250. The status information describes the current execution status (e.g., waiting, running, complete, etc.) of the operators in a query plan. For example, status module 250 may query database 250 for status information that is related to the query plan. The status information can then be associated with operator nodes in the query tree.

Display module 230 may display the query tree with metrics and status information. Although the components of display module 230 are described in detail below, additional details regarding an example implementation of module 230 are provided above in connection with instructions 126 and 128 of FIG. 1.

Tree rendering module 232 renders query trees for presentation the user. Specifically, tree rendering module 232 may render and allow a user to interact with a query tree in a user interface such as described below with respect to FIG. 6A. For example, tree rendering module 232 may allow the user to navigate (e.g., zoom, pan, etc.) in the display of the query tree. Tree rendering module 232 may also allow the user to select operator nodes to view detailed information (e.g., selectivity, throughput, network bandwidth, number of database computing devices executing the operator, whether the operator runs in fenced mode, etc.) or to perform isolated subquery analysis.

Tree rendering module 232 includes the performance metrics and status information in the display of the query tree. For example, each operator node may be color-coded according to the execution status of the operator node. In this example, each operator node may also include its corresponding performance metrics in a bar chart. Such a display allows the user to quickly review the performance metrics, status information, and operator dependencies for a query tree on a unified display.

Time shift module 234 provides playback functionality for query trees. For example, time shift module 234 can allow a user to time-shift a historical record of a query tree throughout the execution of the query. In this example, the user can pause, rewind, fast-forward, skip, etc. the playback of the query tree. In another example, time shift module 234 allows the user with playback functionality of the query plan during the execution of the query. In this case, the user can pause the real-time representation of the query plan during the execution to review a snapshot of the rendered query plan. Time shift functionality can be used by the user to perform various tasks such as debugging a query, identifying query parts responsible for adding a significant delay or for creating a problem (e.g., a disk spill), etc.

Database 250 may be any database system accessible to computing device 200 over the network 245 that is suitable for providing database content. Database 250 may provide database content as data tables, data views, stored procedures, indexes, sequences, etc. Further, database 250 may be installed on any hardware storage device such as one or more hard disk drives, solid state drives, tape drives, and/or any other storage devices (i.e., a parallel or distributed database). The storage devices may be, as shown, in another device in communication with computing device 200 via the network 245. Alternatively, the storage devices and database 250 may be located in computing device 200.

In some cases, the functionality described above with respect to computing device 200 may be applied to execution engines other than databases that can provide execution plans and performance metrics. For example, database 250 can be replaced with an execution engine for accessing a distributed file system (DFS). In this example, execution languages other than SQL can be used to access the execution engine.

In some cases, computing device 200 is configured to support parallel execution engines, which allow query analytics to show (1) performance of query operations on multiple machines; (2) data movement across multiple operations and multiple machines; and (3) real-time statistics on the query tree such as selectivity, throughput, network bandwidth, etc. In these cases, database 250 may include a cluster of database server nodes and corresponding storage devices that communicate over the network 245. For example, each operator node in a query tree may be shown to be associated with one or more database server nodes in the cluster depending on how the query is distributed across the cluster.

Figure 3:
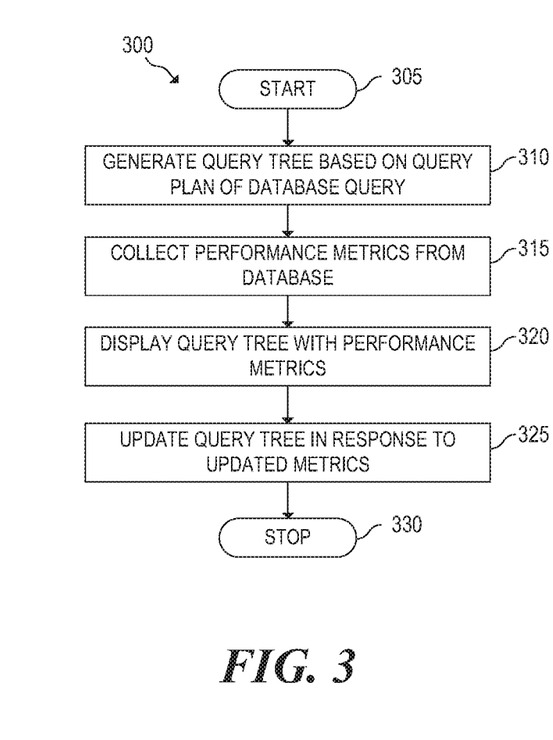
FIG. 3 is a flowchart of an example method for execution by a computing device for providing real-time monitoring and analysis of query execution.

FIG. 3 is a flowchart of an example method 300 for execution by a computing device 100 for providing real-time monitoring and analysis of query execution. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 generates a query tree based on a query plan. The query plan may be obtained from a database that is scheduled to execute a corresponding query. In block 315, performance metrics for the query plan are collected from the database. Specifically, performance metrics for each of the operator nodes, from each machine on which the operators are executing, in the query plan may be collected.

In block 320, the query tree is displayed with the performance metrics. The query tree may be rendered as a hierarchical tree with the performance metrics shown in the operator nodes. In block 325, the query tree is updated in response to updated performance metrics. As the query is executed, the performance metrics are collected in real-time and used to update the rendering of the query tree. Method 300 may then continue to block 330, where method 300 may stop.

Figure 4:
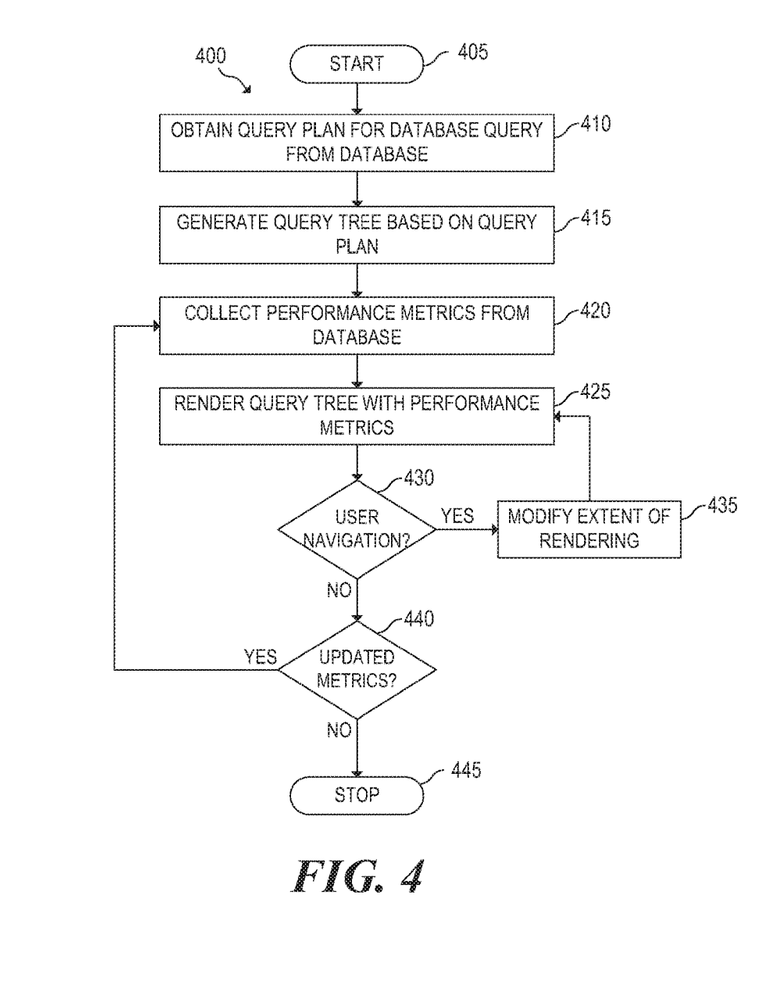
FIG. 4 is a flowchart of an example method for execution by a computing device for navigating and updating real-time metrics and analytics of query execution.

FIG. 4 is a flowchart of an example method 400 for execution by a computing device 200 for navigating and updating real-time metrics and analytics of query execution. Although execution of method 400 is described below with reference to computing device 200 of FIG. 2, other suitable devices for execution of method 400 may be used, such as computing device 100 of FIG. 1. Method 400 may be implemented in the form of executable instructions stored on a machine-readable storage medium, such as storage medium 120, and/or in the form of electronic circuitry.

Method 400 may start in block 405 and continue to block 410, where computing device 200 obtains a query plan from a database. The query plan may be for a query that is submitted to the database for execution and analysis. In block 415, a query tree is generated based on the query plan. In block 420, performance metrics for the query plan are collected from the database. In block 425, the query tree is displayed with the performance metrics in a user interface with navigation controls such as the interface described below with respect to FIG. 6A.

In block 430, computing device 200 determines if user navigation input has been received. User navigation input may include a request to pan the query tree, a request to zoom on the query tree, a selection in an overview tree (e.g., overview tree 606 of FIG. 6A), a selection of an operator node, tree orientation, select a particular server node in the cluster for restricting the displayed metrics, etc. If user navigation input has been received, the extent of the rendering of the query tree may be modified in block 435. For example, the user interface may be zoomed to a selected operator node. In another example, the extent of the user interface may be modified to match a selection in the overview tree. At this stage, method 400 returns to block 425, where computing device 200 renders the query tree at the modified extent.

If user navigation input is not received, computing device 200 determines if updated metrics are available from database in block 440. If updated metrics are available, method 400 returns to block 420, where computing device 200 collects the updated performance metrics. If updated metrics are not available, method 400 may then continue to block 445, where method 400 may stop.

Figure 5:
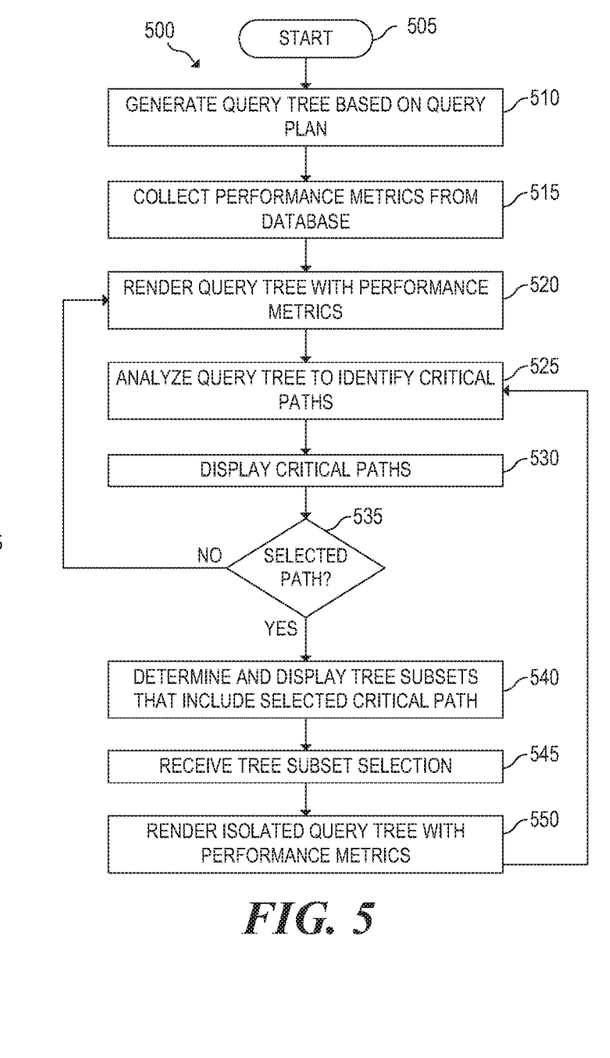
FIG. 5 is a flowchart of an example method for execution by a computing device for providing critical path analysis of query execution.

FIG. 5 is a flowchart of an example method 500 for execution by a computing device 100 for providing critical path analysis of query execution. Although execution of method 500 is described below with reference to computing device 200 of FIG. 2, other suitable devices for execution of method 500 may be used, such as computing device 100 of FIG. 1. Method 500 may be implemented in the form of executable instructions stored on a machine-readable storage medium, such as storage medium 120, and/or in the form of electronic circuitry.

In block 510, computing device 200 generates a query tree based on a query plan from a database. In block 515, performance metrics for the query plan are collected from the database. In block 520, the query tree is displayed with the performance metrics in a user interface with navigation controls.

In block 525, the query tree is analyzed to identify critical paths. Specifically, the performance metrics of the operator nodes in the query tree may be analyzed to identify operator nodes that use excessive resources. In block 530, the critical paths are displayed for review by the user. For example, the critical paths may be highlighted within the display of the query tree. In block 535, computing device 200 determines if a critical path has been selected by the user. If a critical path is not selected by the user, method 500 returns to block 520, where computing device 200 refreshes the display of the query tree with updated performance metrics.

If a critical path is selected, computing device 200 determines and displays tree subsets that include the critical path for review by the user in block 540. Each tree subset may include the operator nodes in the selected critical path and any additional operator nodes that should be included for creating a subquery as described above with respect to FIG. 2. In block 545, the user selects one of the tree subsets for further analysis. In response to the selection, an isolated query tree including the selected tree subset and corresponding performance metrics may be rendered in block 550. The user can then use the isolated query tree to perform a more detailed analysis of the tree subset of the query tree. Method 500 may then return to block 525 to identify the critical paths of the isolated query tree as described above with respect to the complete query tree. In this manner, the critical path analysis may be repeated multiple times to hone in on the operator node that is the potential cause of the issue.

Figure 6A:
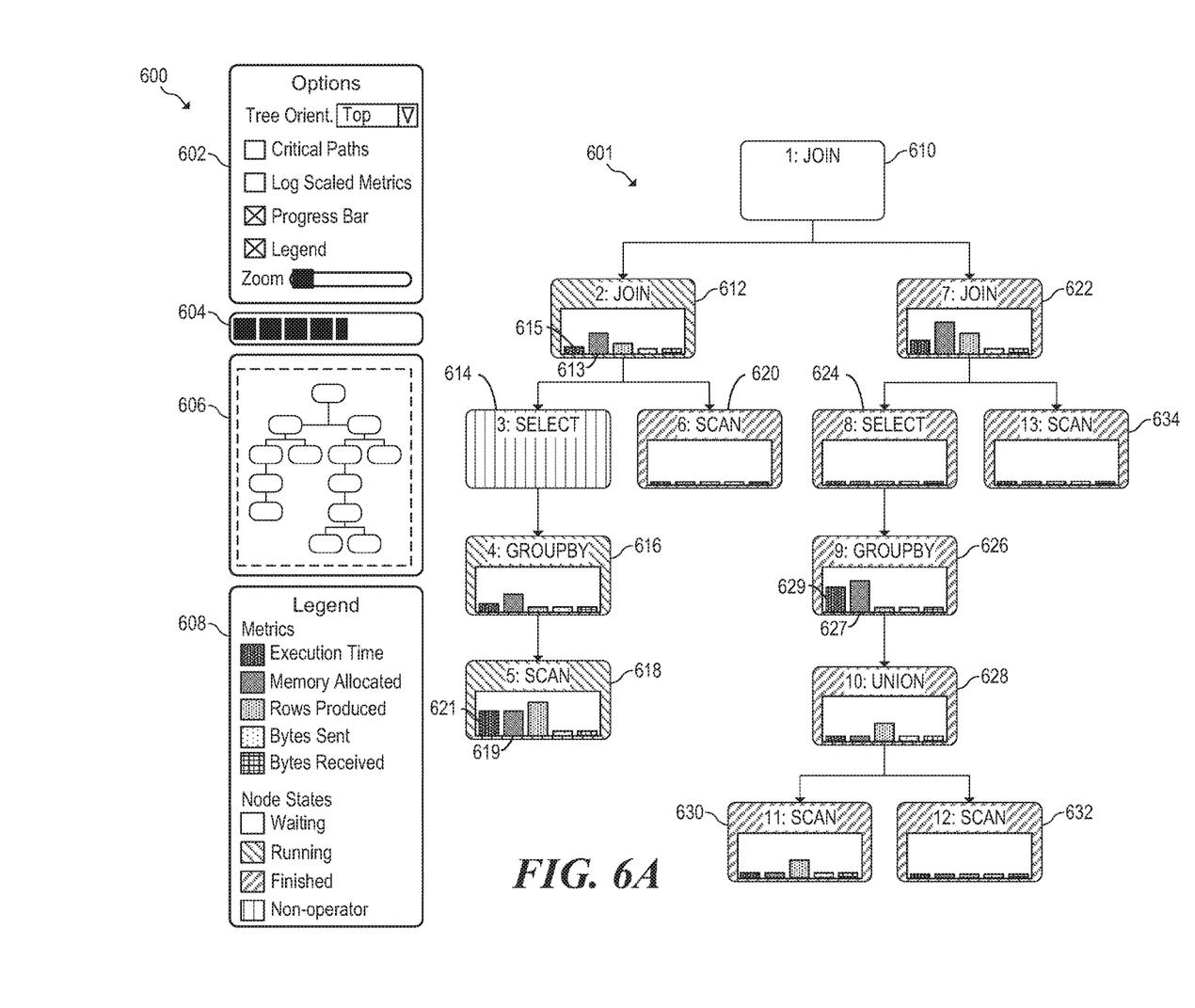
FIGS. 6A, 6B, and 6C show an example user interface 600 for providing real-time monitoring and analysis of query execution.
Figure 6B:
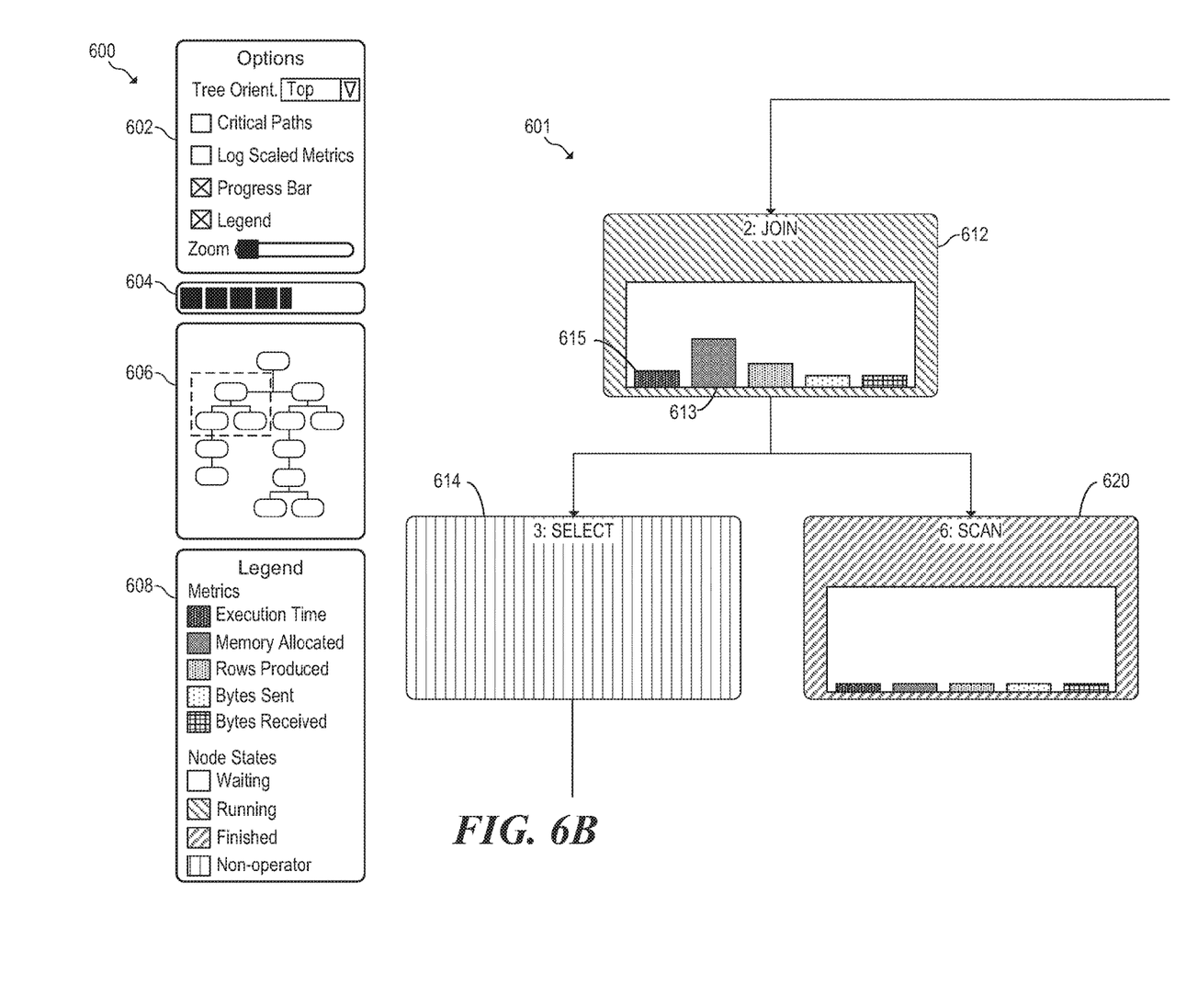
Figure 6C:
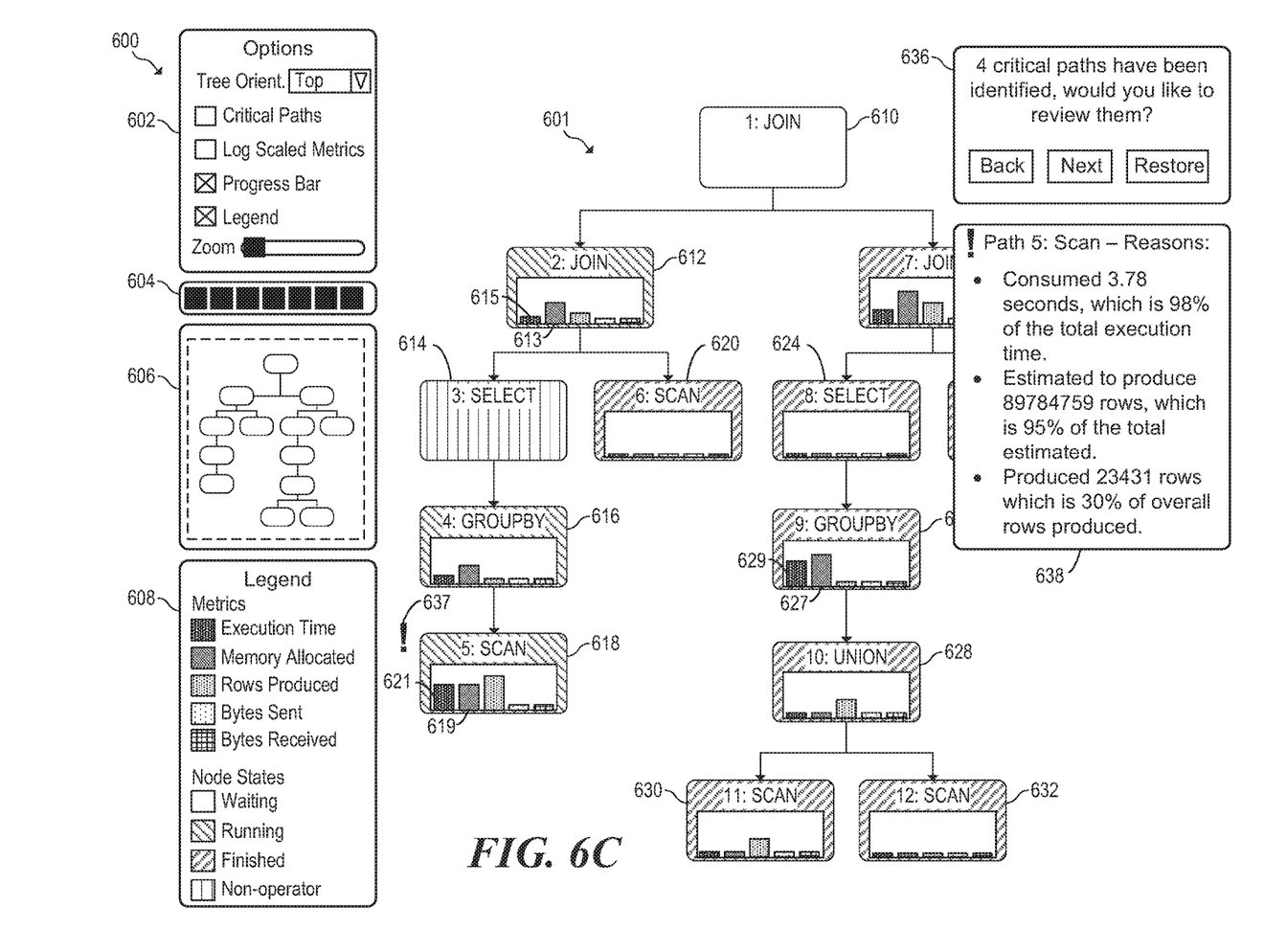

FIGS. 6A, 6B, and 6C show an example user interface 600 for providing real-time monitoring and analysis of query execution. As depicted, the user interface includes a query tree 601 showing the operators of a query that is executing in a database. The user interface 600 also includes an options panel 602, a progress indicator 604, an overview tree 606, and a legend 608.

In FIG. 6A, the query tree 601 shows operators with performance metrics that are hierarchical arranged. The performance metrics are shown in this case as bars but other formats may be used for representing the metrics. Further, each performance bar show may have its own scale (e.g., the execution time and reserved memory bars may have the same height in the visualization but show values in different scales such as 2 msec and 5 GB). In this example, the root node is a join operator 610 that is shown to be waiting on its descendant nodes 612 and 622. Join node 612 is shown to be running, and its descendant nodes include select node 614, which is a non-operator, and scan node 620, which is finished. Non-operator indicates that the operator will not be executed because it has been optimized out of the query plan. The performance metric's displayed in join node 612 show that a large amount of memory 613 has been allocated for the join and that a significant amount of execution time 615 has been dedicated to the join.

Select node 614 has dependent group by node 616, which in turn has dependent scan node 618. The performance metrics in scan node 618 indicate that an excessive amount of memory 619 has been allocated for the group by and that a large amount of execution time 621 has been dedicated to the group by. In this example, join node 612 and scan node 618 may be identified as being on a critical path if a critical path analysis is performed as described above with respect to FIG. 5.

Join node 622 is shown to be finished and its descendant nodes include select node 624 and scan node 634, which are both finished. Select node 624 has dependent group by node 626, which in turn has dependent union node 628. The descendant nodes of union node 628 include scan node 630 and scan node 632. Similar to group by node 616, the performance metrics of group by node 626 indicate that an excessive amount of memory 627 has been allocated for the group by and that a large amount of execution time 629 has been dedicated to the group by. Thus, join node 622 and group by node 626 may also be identified as being on a critical path if a critical path analysis is performed as described above with respect to FIG. 5.

Options panel 602 includes options for "Critical Paths," "Log Scaled Metrics," "Progress indicator," and "Legend," The "Critical Paths" option allows the user to initiate a critical path analysis as described above. For example, after a query is completed, the query tree can be annotated with extra information showing the nodes or tree subsets of the query tree that had the most significant impact in the query's execution as shown in FIG. 6C. A user may then either investigate these critical paths individually or choose to review a display of multiple critical paths 636 in FIG. 6C. The critical paths results may include an explanation 638 in FIG. 6C of why a selected path 637 in FIG. 6C is important to query execution. Example information that may be included in a path explanation includes, but is not limited to: the percentage of total execution time dedicated to a node or tree subset of the query tree; and/or estimated and actual rows produced by a node or tree subset of the query tree.

The "Log Scaled Metrics" option allows the user to change the scale of the performance metrics display in the query tree 601. In this case, logarithmic scaled metrics allow for smaller values in performance metrics to be represented more prominently in the operator nodes. The "Progress indicator" option toggles the display of progress indicator 604, and the "Legend" option toggles the display of legend 608. In some cases, multiple progress indicators and corresponding option toggles may be included to show the progress of various measures (e.g., rows produced, query completion, etc.).

Options panel 602 also includes an orientation option that allows the user to change the orientation of the query tree 601. For example, a user may reorient query tree 601 (e.g., left-to-right rather than top-down) to better use the available space depending on the shape of the tree (e.g., if the query tree is especially broad or deep). Further, in some cases, the display of query tree 601 may be configured to automatically focusing on operator nodes that are active. Such functionality allows a user with a good understanding of the query structure to focus on particular execution details.

Progress indicator 604 shows the overall progress of the execution of the query. In this example, progress indicator shows that the query is approximately 66% complete. For example, query progress may be reported in terms of operator nodes started, finished, or waiting. An example formula for estimating query progress at time t can be derived as follows:

$$\text{percentage\_of\_progress}(t) = \text{current\_status}(t)*100/\text{max},$$

Where max=#n*wF, and current_status=wF*nF(t)+wR*nR(t). In this example, #n is a total number of paths in the query tree; nF(t), nR(t) are a number of paths finished and still running, respectively, at time t; and wF, wR are weights for the nodes finished and still running, respectively. In another example, query progress may be reported in terms of rows produced versus estimated rows produced or in terms of some other metric that measures the work completed by the query.

Overview tree 606 shows an overview of query tree 601 and allows the user to navigate to specific portions of query tree 601. For example, in response to user drawing an extent box in overview tree 606, the extent of query tree 601 may be modified to match the bounds of the extent box. In FIG. 6B, a zoomed portion of the query tree 601 is shown, where overview tree includes a dashed box to show the new bounds of the view. In some cases, the display of query tree 601 may be simplified depending on the zoom level of the display. Overview tree 606 typically shows a simplified query tree with suppressed operator nodes as described above. The size of the overview tree 606 is fixed, and accordingly, the visualization of the overview tree is forced to fit in the fixed space. On the other hand, the query tree 601 may use as much space as needed depending on the zooming level chosen, but the display of the query tree 601 may be bound by the available viewing area. In this case, the user can navigate around the query tree 601 to view the remaining portions of the query tree.

For example, the display of leaf nodes and other descendant nodes may be suppressed until the user zooms into a predetermined scale. In another example, the display operator nodes may be suppressed based on their corresponding performance metrics and execution status (e.g., non-operator nodes, finished operator nodes, and/or operator nodes with lower performance metrics may be suppressed at certain zoom levels). In yet another example, the suppression of operator nodes may be modeled as an optimization problem where a tree subset of the operator nodes that satisfy a function $f_{imp}$(tree,constraints) of the query tree and a set of constraints is determined. The solution to the function determines which nodes should be visualized in the display. Example constraints in the function involve a fixed space (e.g., a fixed number of nodes or a fixed bounding box for the tree), the update frequency of the display, a notion of importance (e.g., a node comparator that computes the relationship $n_1 > n_2$ between two query tree nodes $n_1$ and $n_2$), etc. Further, the function is dynamic because at a time t, a node n may have high information value that should be displayed, while at a time t+1 the same node n may have low information value that should be hidden. As an example, if the query is executed in a database, the fixed space constraint may be solved by using a continuous query targeting the system tables and collecting measurement data that lasts as long as the query is executing.

The foregoing disclosure describes a number of example embodiments for providing real-time monitoring and analysis of query execution. In this manner, the embodiments disclosed herein enable real-time analysis of queries to be performed by providing real-time performance metrics and critical path analysis of rendered query plans.

We claim:

1. A system for providing real-time monitoring and analysis of query execution, the system comprising of:
    a processor to:
        obtain a query plan for a database query scheduled for execution in a database;
        generate a query tree based on the query plan, wherein the query tree comprises a plurality of operator nodes each of which is associated with a corresponding operator in the query plan;
        collect performance metrics from the database, wherein the performance metrics measure performance of the database query during execution of the database query in the database;
        display the query tree with the performance metrics, wherein a related portion of the performance metrics is displayed as a graphical representation inside each of the plurality of operator nodes;
        as the execution of the database query continues, collect updates to the performance metrics from the database; and
        in response to collecting the updates to the performance metrics, update, in real-time, the related portion of the performance metrics displayed as the graphical representation inside each of the plurality of operator nodes based on the updates to the performance metrics.

2. The system of claim 1, wherein the processor is further to:
display an overview tree of the query plan, wherein the overview tree is used to navigate to a different extent in a display of query tree.

3. The system of claim 1, wherein the processor is further to:
display a progress indicator to show progress of the execution of the database query, wherein each operator node of the plurality of operator nodes is color-coded based on an execution status of an operator corresponding to the operator node.

4. The system of claim 1, wherein the database is a parallel database comprising a plurality of database computing devices, and wherein the query plan is executed in parallel on the plurality of database computing devices.

5. The system of claim 1, wherein the processor is further to:
identify a plurality of critical paths in the query tree based on the performance metrics; and
determine a plurality of tree subsets based on the plurality of critical paths, wherein each of the plurality of tree subsets includes a critical path of the plurality of critical paths and descendent nodes of the critical path from the plurality of operator nodes.

6. The system of claim 5, wherein the processor is further to:
in response to a user selecting a target subset of the plurality of tree subsets, generate a new subquery for the target subset comprising additional syntax that allows operators in the target subset to be executed in the database; and
display an isolated query tree for the new subquery.

7. The system of claim 1, wherein the display of a query tree suppresses a low priority node of the plurality of operator nodes based on the related portion of performance metrics.

8. The system of claim 1, wherein the processor is further to:
identify a plurality of critical paths in the query tree based on resource usage determined from the performance metrics; and
responsive to identifying the plurality of critical paths in the query tree, update a display of operator nodes associated with the plurality of critical paths in the query tree.

9. A method for providing real-time monitoring and analysis of query execution, the method comprising:
obtaining a query plan for a database query scheduled for execution in a database;
generating a query tree based on the query plan, wherein the query tree comprises a plurality of operator nodes each of which is associated with a corresponding operator in the query plan;
collecting performance metrics, in real-time, from the database during the execution of the database query;
displaying the query tree with the performance metrics, in real-time, wherein a related portion of the performance metrics is displayed as a graphical representation inside each of the plurality of operator nodes;
identifying a plurality of critical paths in the query tree based on resource usage determined from the performance metrics; and
responsive to identifying the plurality of critical paths in the query tree, updating a display of operator nodes associated with the plurality of critical paths in the query tree.

10. The method of claim 9, further comprising:
display a progress indicator to show progress of the execution of the database query, wherein each operator node of the plurality of operator nodes is color-coded based on an execution status of an operator corresponding to the operator node.

11. The method of claim 9, further comprising:
determining a plurality of tree subsets based on the plurality of critical paths, wherein each of the plurality of tree subsets includes a critical path of the plurality of critical paths and descendent nodes of the critical path from the plurality of operator nodes.

12. The method of claim 11, further comprising:
in response to a user selecting a target subset of the plurality of tree subsets, generating a new subquery for the target subset comprising additional syntax that allows operators in the target subset to be executed in the database; and
displaying an isolated query tree for the new subquery.

13. The method of claim 9, wherein a display of query tree suppresses a low priority node of the plurality of operator nodes based on the related portion of performance metrics.

14. The method of claim 9, further comprising:
as the execution of the database query continues, collecting updates to the performance metrics from the database; and
responsive to receiving the updates to the performance metrics, updating the related portion displayed as the graphical representation inside each of the plurality of operator nodes based on the updates to the performance metrics.

15. A non-transitory machine-readable storage medium encoded with instructions executable by a processor for providing real-time monitoring and analysis of query execution, the machine-readable storage medium comprising instructions to:
obtain a query plan for a database query scheduled for execution in a database, wherein the database is a parallel database comprising a plurality of database computing devices, and wherein the query plan is executed in parallel on the plurality of database computing devices;
generate a query tree based on the query plan, wherein the query tree comprises a plurality of operator nodes each of which is associated with a corresponding operator in the query plan;
collect performance metrics from the plurality of database devices, wherein the performance metrics measure performance of the database query during execution of the database query on the plurality of database devices;
display the query tree with the performance metrics, wherein a related portion of the performance metrics is displayed as a graphical representation inside each of the plurality of operator nodes, and wherein each of the plurality of operator nodes is shown to be associated with at least one of the plurality of database devices;
as the execution of the database query continues, collect updates to the performance metrics from the database; and
in response to collecting the updates to the performance metrics from the database, update, in real-time, the related portion of the performance metrics displayed as the graphical representation inside each of the plurality of operator nodes based on the updates to the performance metrics.

16. The machine-readable storage medium of claim 15, wherein the machine-readable storage medium further comprises instructions to:
   identify a plurality of critical paths in the query tree based on the performance metrics; and
   determine a plurality of tree subsets based on the plurality of critical paths, wherein each of the plurality of tree subsets includes a critical path of the plurality of critical paths and descendent nodes of the critical path from the plurality of operator nodes.

17. The machine-readable storage medium of claim 16, wherein the machine-readable storage medium further comprises instructions to:
   in response to a user selecting a target subset of the plurality of tree subsets, generate a new subquery for the target subset comprising additional syntax that allows operators in the target subset to be executed in the database; and
   display an isolated query tree for the new subquery.

18. The machine-readable storage medium of claim 15, wherein the processor is further to:
   identify a plurality of critical paths in the query tree based on resource usage determined from the performance metrics; and
   responsive to identifying the plurality of critical paths in the query tree, update a display of operator nodes associated with the plurality of critical paths in the query tree.

* * * * *